United States Patent
Yamamoto et al.

(10) Patent No.: US 6,920,489 B1
(45) Date of Patent: Jul. 19, 2005

(54) SERVER STORING PROCESSING RESULT OF FIRST REQUEST AND RETURNING STORED PROCESSING RESULT IN RESPONSE TO IDENTICAL REQUESTS

(75) Inventors: Minoru Yamamoto, Tokyo (JP); Takashi Kaneda, Tokyo (JP); Yuji Iwasaki, Tokyo (JP); Hiroki Ueda, Tokyo (JP)

(73) Assignee: Fujitsu Limited, Kawasaki (JP)

( * ) Notice: Subject to any disclaimer, the term of this patent is extended or adjusted under 35 U.S.C. 154(b) by 486 days.

(21) Appl. No.: 09/688,046

(22) Filed: Oct. 12, 2000

(30) Foreign Application Priority Data

Feb. 3, 2000 (JP) ........................................ 2000-026019

(51) Int. Cl.[7] .............................................. G06F 15/16
(52) U.S. Cl. ...................... 709/219; 709/227
(58) Field of Search ................... 709/219, 227, 709/203, 229, 201

(56) References Cited

U.S. PATENT DOCUMENTS

| | | | | |
|---|---|---|---|---|
| 5,696,966 A | * | 12/1997 | Velarde | 707/10 |
| 6,023,722 A | * | 2/2000 | Colyer | 709/201 |
| 6,112,279 A | * | 8/2000 | Wang | 711/119 |
| 6,157,942 A | * | 12/2000 | Chu et al. | 709/203 |
| 6,237,035 B1 | * | 5/2001 | Himmel et al. | 709/224 |
| 6,289,382 B1 | * | 9/2001 | Bowman-Amuah | 709/226 |
| 6,430,618 B1 | * | 8/2002 | Karger et al. | 709/225 |
| 2003/0051100 A1 | * | 3/2003 | Patel | 711/118 |
| 2003/0187995 A1 | * | 10/2003 | Fok et al. | 709/227 |

* cited by examiner

*Primary Examiner*—Bradley Edelman
(74) *Attorney, Agent, or Firm*—Staas & Halsey LLP

(57) ABSTRACT

In a server which receives a request of processing from a client, and returns a processing result of the request to the client, a result storing unit stores at least one processing result of at least one request. When a determination unit determines that no other request which is identical to a request received from a client has been processed, an execution unit executes processing of the request received from the client, and stores a result of the processing in the result storing unit. When the determination unit determines that another request which is identical to a request received from a client has already been processed, a transmission unit transmits to the client one of the at least one processing result corresponding to the request received from the client.

2 Claims, 11 Drawing Sheets

SERVER STORING PROCESSING RESULT OF FIRST REQUEST AND RETURNING STORED PROCESSING RESULT IN RESPONSE TO IDENTICAL REQUESTS

BACKGROUND OF THE INVENTION

1) Field of the Invention

The present invention relates to a server, which executes processing in response to a request transmitted from a client, and returns the result of the processing to the client.

2) Description of the Related Art

For example, when a client acquires information from a WWW (World Wide Web) server through the Internet, generally, a protocol called HTTP (Hyper Text Transfer Protocol) is used for downloading an HTML (Hyper Text Markup Language) document.

In the above system, a browser of a client transmits a request for processing to a server, the server executes the requested processing, and a result of the processing is returned to the client, and displayed by the browser. That is, processing executed by the client is only the transmission of the request and the display of the result of the processing executed by the server, and most of processing is executed by the server. Therefore, a heavy load is imposed on the server.

Usually, a request is sent from a client to a server when a user manipulates a button which is graphically displayed by a browser on the screen. In the currently prevailing operating systems, various commands are input by double-clicking an icon. Therefore, many users apt to double-click buttons even on the browser screen, due to the habit of double-clicking icons. However, a command is usually input when a button is clicked once on the screen displayed by the browser. Therefore, when a button on the browser screen is double-clicked, two identical commands are transmitted to the server, and the server repeats identical processing twice. Thus, such an unnecessary repeat of identical processing further increases the load imposed on the server, causes delay in processing in the server, and reduces the processing capabilities of the system.

In particular, when the traffic is dense, it takes a long time until a result of processing is displayed after a user requests the processing by manipulating a button. Therefore, users become impatient to see the result of processing, and often click an identical button repeatedly. Such repeated clicking also causes delay in processing in the server.

Further, repeated clicking of an identical button may cause a mismatch between data. For example, when a transmission button is repeatedly manipulated on the screen displayed for member registration, a user may be doubly registered.

SUMMARY OF THE INVENTION

An object of the present invention is to provide a server which can reduce a load imposed on the server due to transmission of a plurality of identical requests, and maintain processing speed even when the server receives a plurality of identical requests.

Another object of the present invention is to provide a server which prevents occurrence of a mismatch between data even when the server receives a plurality of identical requests from a client.

(1) According to the first aspect of the present invention, there is provided a server comprising: a result storing unit which stores at least one processing result of at least one request; a receiving unit which receives a request for processing from a client; a determination unit which determines whether or not another request, which is identical to the request received from the client, has already been processed; an execution unit which executes processing of the request received from the client, and stores a result of the processing in the result storing unit when the determination unit determines that no other request which is identical to the request received from the client, has been processed; and a transmission unit which transmits to the client the result of the processing executed by the execution unit when the determination unit determines that no other request which is identical to the request received from the client, has been processed, and transmits to the client one of the results corresponding to the request received from the client when the determination unit determines that the said another request which is identical to the request received from the client, has already been processed.

The server according to the first aspect of the present invention may also have any possible combination of the following additional features (i) and (ii) possibly.

(i) The determination unit may determine whether or not the said another request which is identical to the request received from the client, has already been processed, when the said another request is received from the client.

(ii) The server may further comprise a request storing unit which stores at least one request received from at least one client, a request reading unit which reads out one of the at least one request stored in the request storing unit, and a prohibiting unit which prohibits the operation of the request reading unit after one of the at least one request stored in the request storing unit is read out until a processing result corresponding to the said one of the at least one request is transmitted to a client.

(2) According to the second aspect of the present invention, there is provided a product for use with a server, the product, when used with the server, is able to output control information which directs the server to realize; a result storing unit which stores at least one processing result of at least one request; a receiving unit which receives a request for processing from a client; a determination unit which determines whether or not another request which is identical to the request received from the client, has already been processed; an execution unit which executes processing of the request received from the client, and stores a result of the processing in the result storing unit when the determination unit determines that no other request which is identical to the request received from the client, has been processed; and a transmission unit which transmits to the client the result of the processing executed by the execution unit when the determination unit determines that no other request which is identical to the request received from the client, has been processed, and transmits to the client one of the results corresponding to the request received from the client when the determination unit determines that the said another request which is identical to the request received from the client, has already been processed.

The product according to the second aspect of the present invention may also have the aforementioned additional features (i) and (ii).

The above and other objects, features and advantages of the present invention will become apparent from the following description when taken in conjunction with the accompanying drawings which illustrate preferred embodiment of the present invention by way of example.

DESCRIPTION OF THE PREFERRED EMBODIMENTS

An embodiment of the present invention is explained below with reference to drawings.

(1) Principle of the Invention

Figure 1:
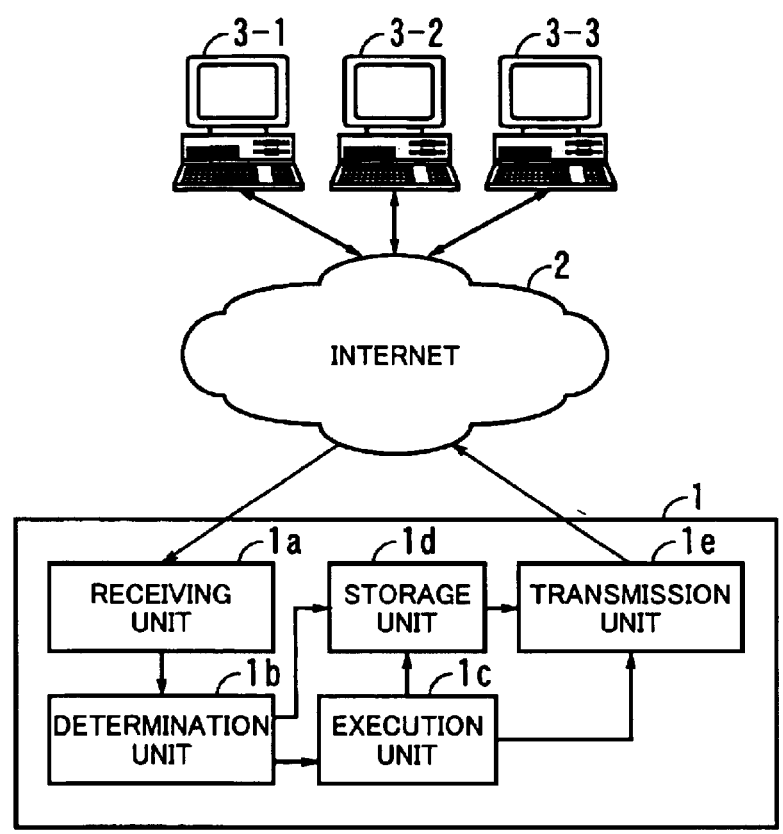
FIG. 1 is a diagram illustrating a basic construction of a server according to the present invention.

FIG. 1 is a diagram illustrating a basic construction of a server according to the present invention. As illustrated in FIG. 1, the server 1 according to the present invention comprises a receiving unit 1a, a determination unit 1b, an execution unit 1c, a storage unit 1d, and a transmission unit 1e. Information is exchanged between the server 1 and the clients 3-1 to 3-3 through the Internet 2.

The receiving unit 1a receives a request from one of the clients 3-1 to 3-3. The determination unit 1b determines whether or not processing requested by the client has already been executed. The execution unit 1c executes the processing requested by the client. The storage unit 1d stores a result of the processing requested by the client. The transmission unit 1e transmits the result of the processing executed by the execution unit 1c when the determination unit 1b determines that the processing requested by the client has not yet been performed. The transmission unit 1e also transmits the result of the processing stored in the storage unit 1d when the determination unit 1b determines that the processing requested by the client has already been performed. The Internet 2 transmits information between the server 1 and the clients 3-1 to 3-3. The clients 3-1 to 3-3 are each realized by, for example, a personal computer, and can acquire and display information stored in the server 1, by a browser, and request the server 1 to execute processing.

The operations of the server 1 are explained below.

When a predetermined button provided for transmitting a request is manipulated twice on a screen displayed by a browser activated on the client 3-1, two identical requests (first and second requests) are successively transmitted through the Internet 2 to the server 1. The receiving unit 1a in the server 1 receives the two requests, and then supplies the requests to the determination unit 1b. The determination unit 1b determines whether or not processing of each request has already been performed. Since, in this case, processing of the first request has not yet been performed, the first request is transferred to the execution unit 1c, and the execution unit 1c executes the processing of the first request. Then, the result of the processing of the first request is supplied to the storage unit 1d and the transmission unit 1e. The storage unit 1d stores the result of the processing, associated with the first request, and the transmission unit 1e returns the result of the processing, which is supplied from the execution unit 1c, to the client 3-1. Thus, the operation in response to the first request is completed, and then an operation in response to the second request is performed as explained below.

The determination unit 1b determines whether or not processing of the second request has already been performed. Since, in this case, the second request is identical to the first request, the determination unit 1b determines that processing of the second request has already been performed, and searches the storage unit 1d for the result of the processing of the first request, and supplies the result of the processing to the transmission unit 1e. The transmission unit 1e returns the result of the processing to the client 3-1. That is, the server does not repeatedly execute the identical processing, and instead acquires the result of the processing stored in the storage unit 1d. Thus, the client 3-1 receives the two identical results of processing. However, the client 3-1 discards the result of processing which is received first, and displays as valid data the result of processing which is received next (lastly), by the browser.

As explained above, when an identical button is repeatedly manipulated on a browser screen of a client, the server according to the present invention actually executes processing of only the first request. In response to the subsequently received identical requests, the server acquires the result of processing stored in the storage unit 1d, and transmits the stored result to the client. Therefore, the load imposed on the server can be reduced. For example, when a button provided for transmitting information on member registration is successively manipulated on a user registration screen, the server performs an operation of registering a user as a member in response to only the first manipulation of the button. In response to the subsequently received identical requests, the server acquires from the storage unit 1d information on completion of registration, which indicates a result of the processing of registering the user as a member, and supplies the information to the client. Therefore, it is possible to prevent double registration.

(2) Hardware Construction

Figure 2:
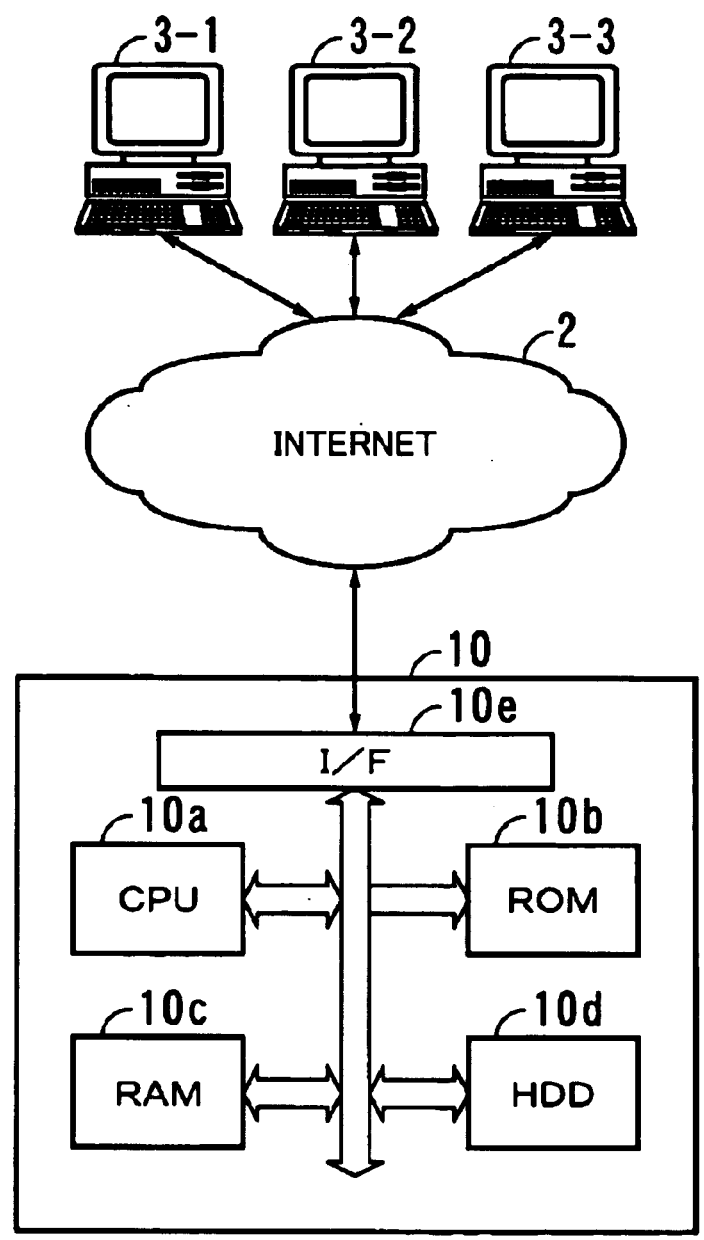
FIG. 2 is a diagram illustrating an example of a hardware construction of the server according to the present invention.

FIG. 2 is a diagram illustrating an example of a hardware construction of the server according to the present invention. As illustrated in FIG. 2, the server 10 exchanges information with the clients 3-1 to 3-3 through the Internet 2, and comprises a CPU (Central Processing Unit) 10a, a ROM (Read Only Memory) 10b, a RAM (Random Access Memory) 10c, an HDD (Hard Disk Drive) 10d, and an I/F (Interface) 10e.

The CPU 10a controls the respective portions of the server 10, and executes various kinds of processing in accordance with programs and data stored in HDD 10d. The ROM 10b stores basic programs to be executed by CPU 10a and data used in the execution of the basic programs. The RAM 10c temporarily stores a currently executed program and data related to the execution. The HDD 10d stores data and programs to be executed. The I/F 10e performs protocol conversion, and enables data exchange with the clients 3-1 to 3-3. The Internet 2 is an aggregate of servers distributed over the world, and transmits information between the server 10 and the clients 3-1 to 3-3. The clients 3-1 to 3-3 are each realized by, for example, a personal computer, send a request to the server 10 through the Internet 2, and display information received from the server 10, by a browser.

(3) Details of Operations

The operations of the server 10 are explained below.

When a client logs in to a server, the server determines whether or not the client is a new client (i.e., a client who first logs into the server), and secures a FIFO for storing requests and a cache for storing results of requested processing when the client is a new client. When the client 3-1 logs into the server 10, the operation of FIG. 3 is performed.

Figure 3:
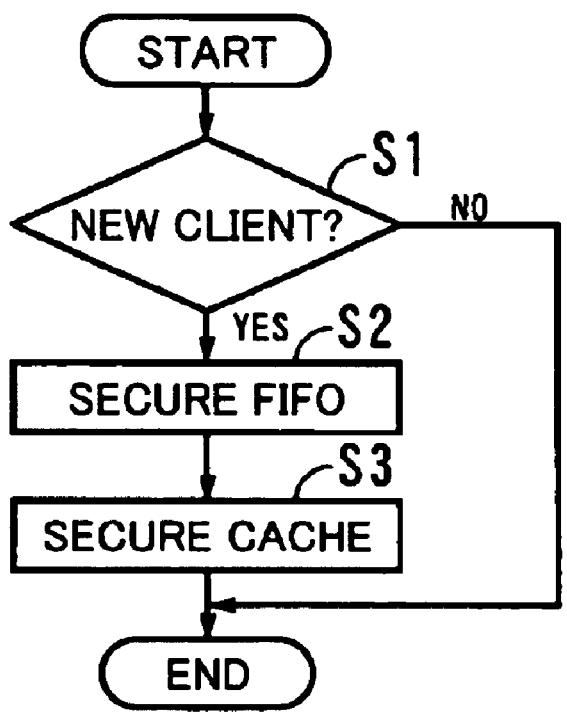
FIG. 3 is a flow diagram illustrating an example of an operation performed when a client logs in to the server according to the present invention.
Figure 4:
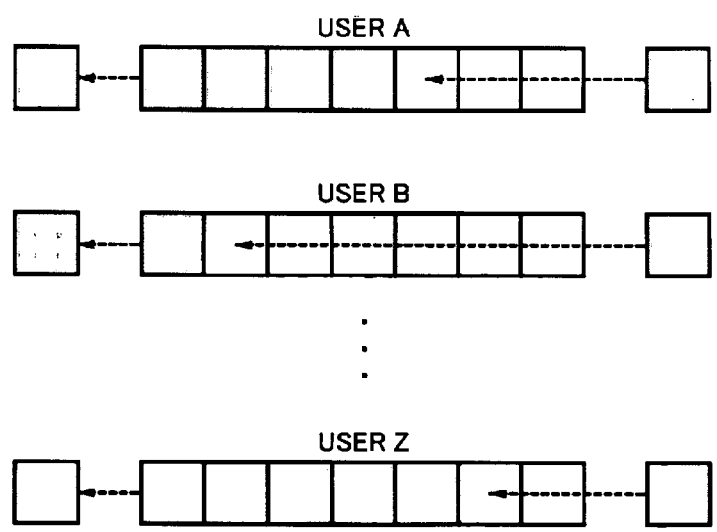
FIG. 4 is a diagram illustrating examples of use of FIFOs.
Figure 5:
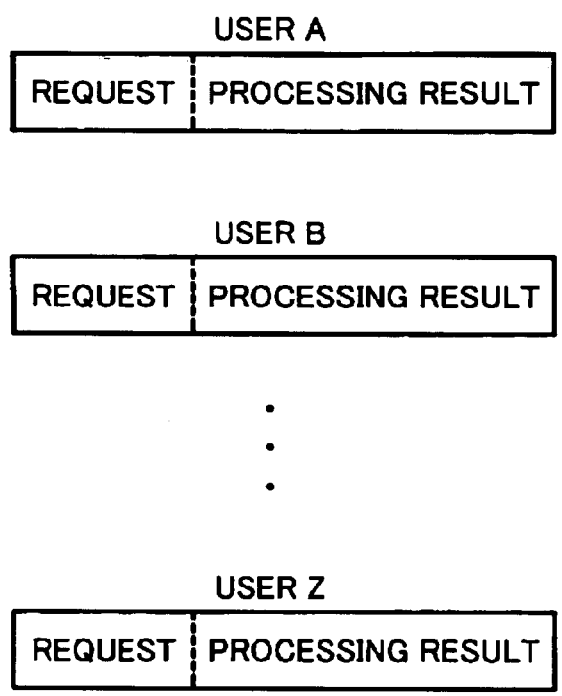
FIG. 5 is a diagram illustrating examples of contents of a cache.

In step S1 of FIG. 3, the CPU 10a determines whether or not the client who logs in to the server is a new client. When 'YES' is determined in step S1, the operation goes to step S2. When 'NO' is determined in step S1, i.e., the client has already logged in to the server, the operation of FIG. 3 is completed. In step S2, the CPU 10a secures a FIFO in a predetermined area of the HDD 10d in order to store for each user at least one request sent from the client. FIG. 4 exhibits examples of use of FIFOs. As illustrated in FIG. 4, a FIFO is secured for each user. In each FIFO, a newly received data item is appended to the end of data items which are already stored, and the oldest data item is first read out. In step S3, the CPU 10a secures a cache in a predetermined area of HDD 10d in order to store for each user at least one result of processing of at least one request. FIG. 5 exhibits examples which a cache contents. As illustrated in FIG. 5, in the cache, at least one result of processing of at least one request is stored for each user, respectively associated with the at least one request. Thus, when a new client logs in to a server, a FIFO and a cache are secured in the HDD 10d. Alternatively, the FIFO and the cache may be secured in the RAM 10c.

When the operation of securing the FIFO and the cache is completed, the server 10 reads out information on a predetermined front page (which is written in the HTML language, and stored in the HDD 10d), and transmits the information on the front page to the client 3-1.

Figure 6:
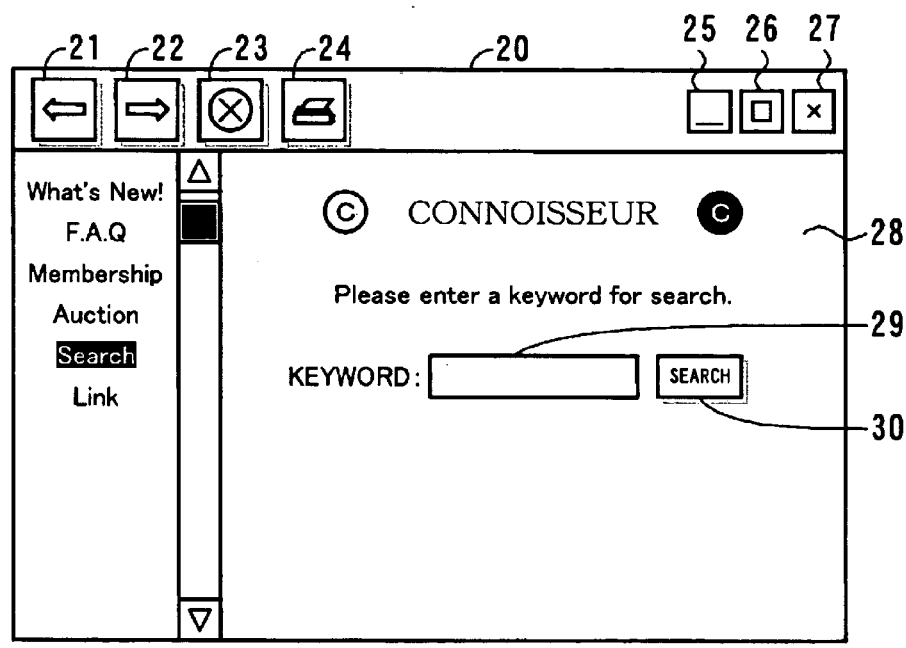
FIG. 6 is a diagram illustrating an example of a window displayed on a client.

When the client 3-1 receives the information on the front page, for example, a window 20 as illustrated in FIG. 6 is displayed on a display device of the client 3-1. Seven buttons 21 to 27 are displayed at the top of the window 20, where the button 21 is provided for going back to a previously displayed page, the button 22 is provided for going forward to a next page, the button 23 is provided for stopping reception (aborting transfer) of information on a new page, the button 24 is provided for printing a currently displayed page, the button 25 is provided for reducing the size of the window 20, the button 26 is provided for expanding the size of the window 20, and the button 27 is provided for closing the window 20. The display area of the window 20 is comprised of right and left frames (columns), where the left frame contains TOC (Table of Contents) links, and the right frame contains the body of the document. The form in the right frame of the window 20 in FIG. 6 contains a title of the home page, a text box 29 for inputting a keyword, and a SEARCH button 30 provided for starting (requesting) a keyword search operation.

First, the present invention is explained below for the case of a search operation.

Figure 7:
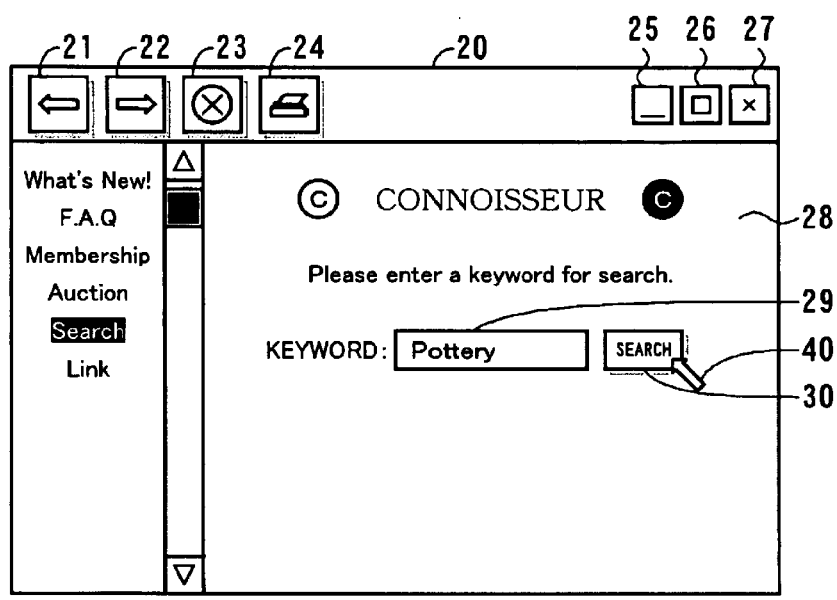
FIG. 7 is a diagram illustrating the window of FIG. 6 when information items are input into predetermined areas.

When the client 3-1 detects manipulation (clicking) of the SEARCH button 30, the client 3-1 transmits to the server 10 a search request corresponding to the manipulation of the SEARCH button 30 and a keyword in the text box 29. For example, when a keyword "Pottery" is input into the text box 29 as illustrated in FIG. 7, and the SEARCH button 30 is manipulated twice by placing the pointer 40 on the SEARCH button 30 and clicking a mouse, two identical search requests (first and second search requests) are successively transmitted to the server 10. When the server 10 receives the above search requests, the server 10 operates in accordance with the flow of FIG. 8, as explained below.

Figure 8:
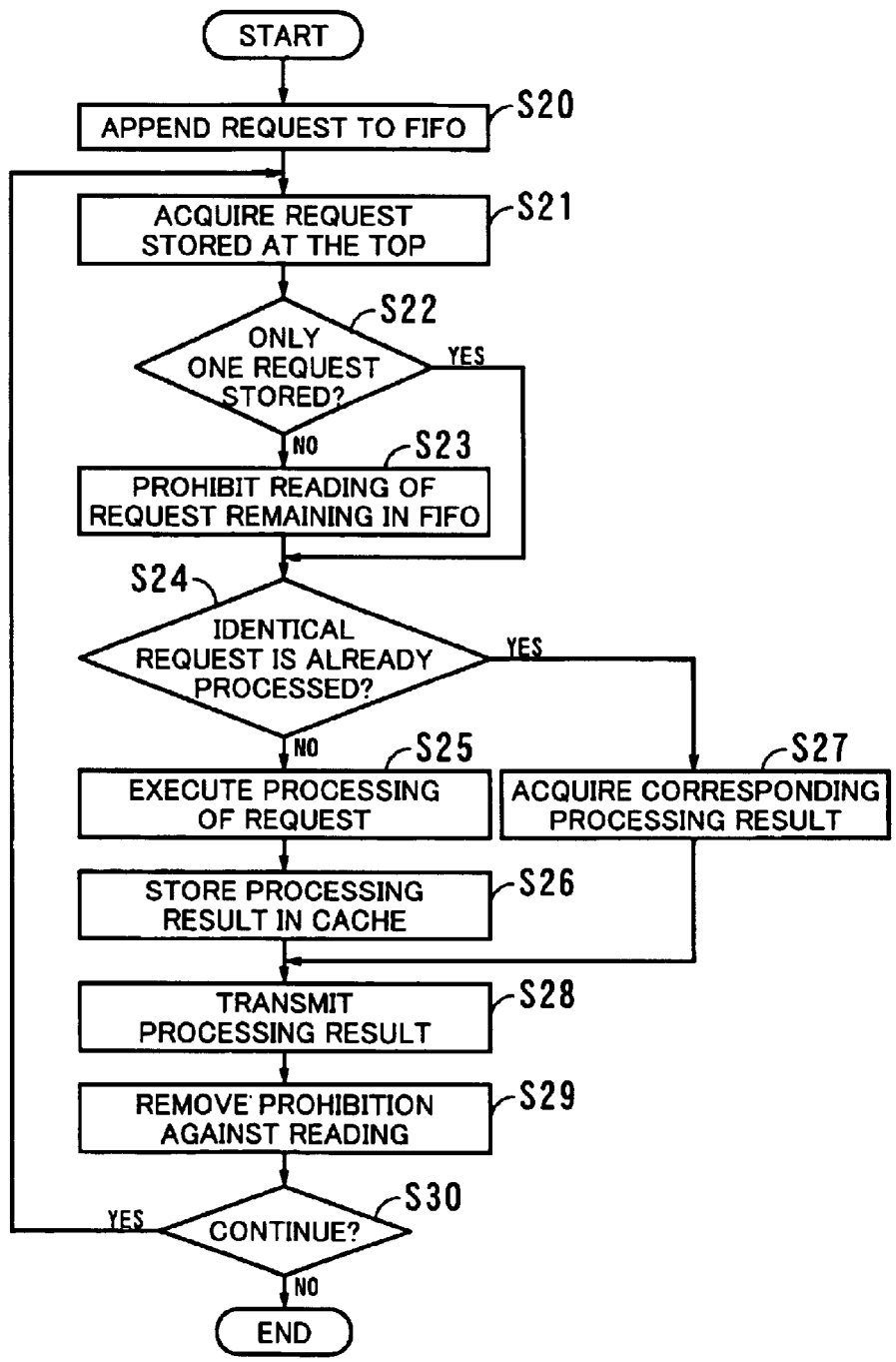
FIG. 8 is a flow diagram illustrating an example of processing which the server executes when the server receives a request.

In step S20 of FIG. 8, the CPU 10a acquires each of the requests received as above, through the I/F 10e, refers to an IP (Internet Protocol) address of the client, which is contained in each request, searches a FIFO corresponding to the IP address, which is secured in the HDD 10d, and appends the requests to the end of contents of the FIFO. If the FIFO is empty, the above two requests received from the client 3-1 are stored from the top address of the FIFO in the order of reception.

In step S21, the CPU 10a acquires the request stored at the top address of the FIFO. In this example, the first request, which is received first, is acquired by the CPU 10a.

In step S22, the CPU 10a determines whether or not the FIFO stores only one request. When yes is determined, the operation goes to step S24. When no is determined, the operation goes to step S23.

In step S23, the CPU 10a prohibits reading of each request remaining in the FIFO. In this example, the second search request (which is received secondly, and remains in the FIFO) is prohibited to be read out from the FIFO. The operation of step S23 is performed in order to prevent execution of processing of requests other than the request acquired in step S21.

In step S24, the CPU 10a determines whether or not the request acquired in step S21 is identical to a previously processed request. When 'YES' is determined, the operation goes to step S27. When 'NO' is determined, the operation goes to step S25.

In step S25, the CPU 10a executes processing of the request acquired in step S21 by acquiring necessary information from the HDD 10d. Since, in this example, the request is the search request based on the keyword "Pottery," a program for performing a search operation is acquired from the HDD 10d, an information item corresponding to the keyword "Pottery" is searched for in a database stored in the HDD 10d.

In step S26, the CPU 10a stores the result of the processing executed in step S25 and the processed request in the cache secured in the HDD 10d. In this example, the search request and the information item corresponding to the keyword "Pottery" are stored in the cache.

In step S27, the CPU 10a acquires a result of processing stored in the cache corresponding to a request which is identical to the request acquired in step S21.

In step S28, the CPU 10a transmits the result of processing obtained in step S25 or S27, to the client which has sent the request acquired in step S21 to the server 10.

In step S29, the CPU 10a removes the prohibition against the reading of the request stored in the FIFO, so that the request stored in the FIFO can be read out.

In step S30, the CPU 10a determines whether or not the operation of FIG. 8 is continued. When yes is determined, the operation goes to step S21. When no is determined, the operation of FIG. 8 is completed. In this example, when the result of the processing of the first search request is transmitted to the client 3-1 in step S28, and the prohibition against the reading of the second search request stored in the FIFO is removed in step S29, the operation goes to step S21, and the CPU 10a acquires the second search request from the FIFO. Since, in this case, no other request is stored in the FIFO, the operation goes to step S24. Since the second search request is identical to the first search request, the CPU 10a determines, in step S24, that the request acquired in step S21 is identical to a previously processed request, and the operation goes to step S27. In step S27, the CPU 10a acquires from the cache the result of the processing of the first search request. Then, the acquired result is transmitted to the client 3-1 in step S28.

Figure 9:
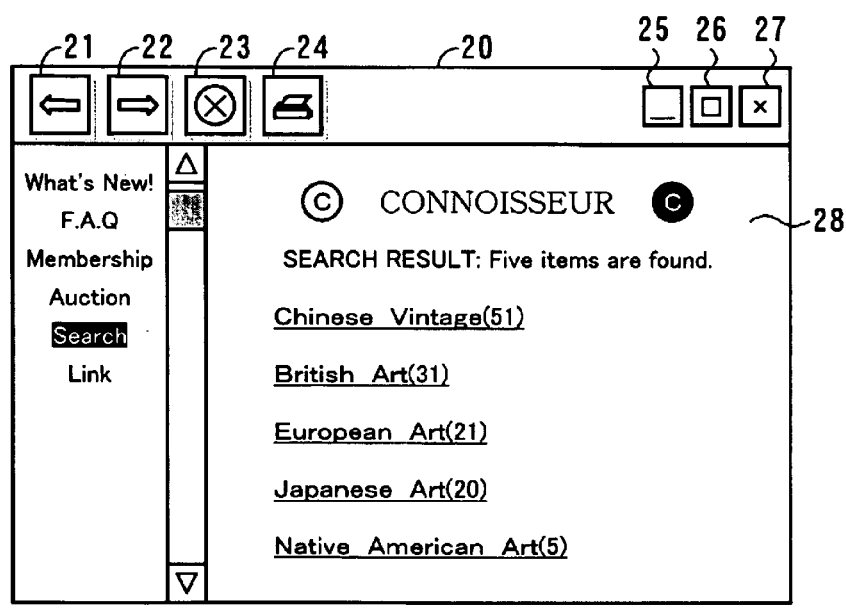
FIG. 9 is a diagram illustrating a window in which a search result is displayed.

Consequently, in the example in which the two identical search requests are sent to the server 10, the client 3-1 receives two identical search results. In this case, the browser discards the first search result, and displays the second search result, for example, as illustrated in FIG. 9. In FIG. 9, a search result based on the keyword "Pottery" is displayed in the right frame 28 of the window 20.

When the client 3-1 logs out of the server 10, or when the server 10 is not accessed by the client 3-1 for a predetermined time, the FIFO and the cache for the client 3-1 are deleted from the HDD 10d or the RAM 10c.

As explained above, the CPU 10a of the server 10 actually processes only the first one of identical requests from each client, stores in a cache the result of the processing of the first one of the identical requests for each client, and transmits the result to each client which has sent the first one of the identical requests. Thereafter, in response to the subsequent ones of the identical requests from each client, the CPU 10a acquires from the cache the result of the processing of the first one of the identical request for each client, and transmits the acquired result to each client. Therefore, it is possible to prevent the server from repeatedly executing identical processing, and substantially increase processing speeds of the server.

Next, the present invention is explained below for the case of an operation of registering a user as a member.

Figure 10:
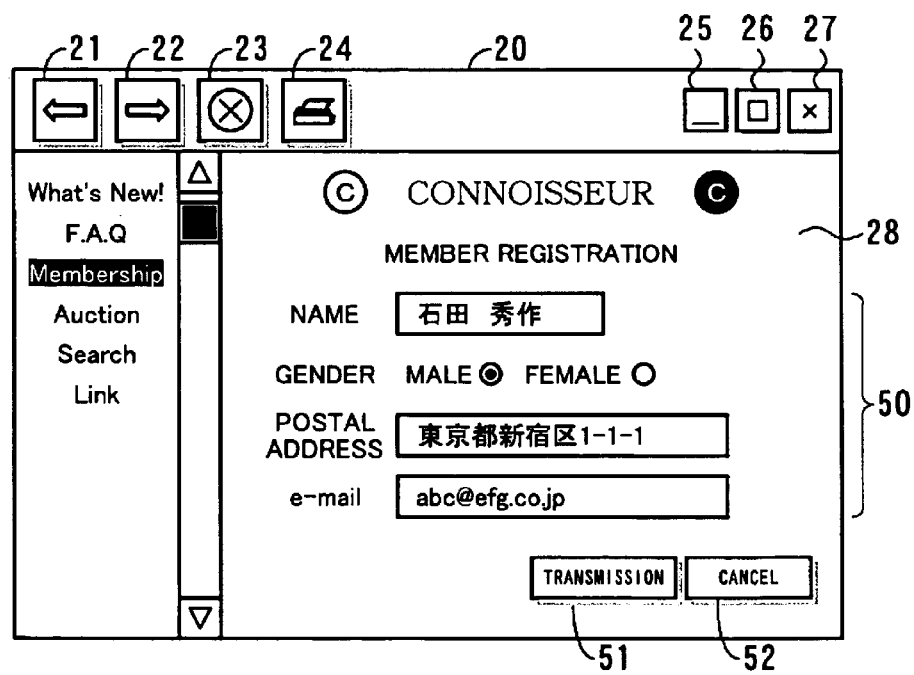
FIG. 10 is a diagram illustrating an example of a window displayed for member registration.

When another of the TOC links, "Membership," is clicked, a form for registering a user as a member is displayed in the right frame, as illustrated in FIG. 10. The form in the right frame of the window 20 in FIG. 10 is displayed for inputting information necessary for member registration, and contains text boxes for inputting the name, postal address, and e-mail address of the user, and option buttons for inputting the gender of the user.

Incidentally, when the above information is written in the Japanese language, full-size characters each having a width of an em, and half-size characters each having a width of an en are mixed in the texts entered in the text boxes. In the current Japanese language input systems, it is necessary to press an enter key in order to confirm and fix a Japanese word comprised of at least one full-size Japanese character after a corresponding sequence of characters is typed into a text box, although it is unnecessary to press the enter key after half-size characters are input. In such a situation, users apt to inadvertently press the enter key even after the input of half-size characters. In addition, when the enter key is pressed after half-size characters are input, the client (computer) recognizes that the transmission button 51 is clicked in the form of FIG. 10. Therefore, even when the enter key is erroneously pressed, the client transmits a member registration request with the information displayed in the right frame of the window 20 in FIG. 10, to the server. When the user does not notice the transmission of the member registration request due to the inadvertent pressing of the enter key, the user further manipulates the transmission button 51 after the inadvertent pressing of the enter key, with the intention of transmitting a member registration request to the server 10. Consequently, two identical member registration requests are inadvertently transmitted from the client to the server. When the conventional servers receives two or more identical member registration requests from the same user, the user is multiple registered in the server since no provision is made for preventing the multiple registration.

Figure 11:
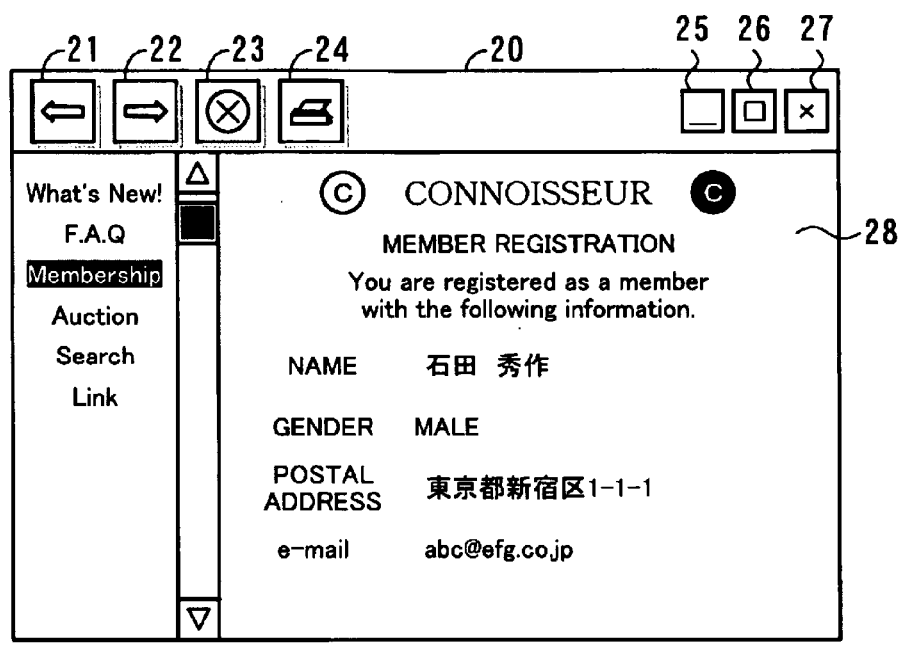
FIG. 11 is a diagram illustrating an example of a window in which a result of the registration is displayed.

However, according to the present invention (e.g., the sequence of FIG. 8), the server executes the processing of registering the user as a member for only the first member registration request. When the server subsequently receives a further member registration request which is identical to the first member registration request, the server determines that the further member registration request is identical to the first member registration request, and transmits to the client information for displaying a result of the registration conducted in response to the first member registration request. FIG. 11 exhibits an example of the window 20 in which a result of the registration is displayed. In the right frame 28 of the window 20 of FIG. 11, details of the registration and a message that the user has been registered with the displayed contents are displayed. The information for displaying the window 20 of FIG. 11 is transmitted from the server to the client every time a member registration request is transmitted from the client to the server.

As explained above, according to the present invention, even when a plurality of identical requests which are not appropriate to be repeatedly processed are transmitted from a client to the server, the server actually processes only the first one of the plurality of identical requests, stores the result of the processing of the first one of the plurality of identical requests, and transmits the result to a client which has sent the first one of the plurality of identical requests. Thereafter, in response to the subsequent ones of the plurality of identical requests, the server acquires the result of the processing of the first one of the plurality of identical requests, and transmits the acquired result to the client. Therefore, it is possible to prevent repeated processing of the identical requests, and a problem due to the repeated processing of the identical request. For example, it is not appropriate to repeatedly register an identical user with identical information. According to the present invention, it is possible to prevent repeated registration of an identical user with identical information.

In the present specification, the requests may or may not contain client identification information (user identification information), in addition to the details of processing which the server is requested to execute.

In the case where requests do not contain client identification information, when a result of processing of a request R received from a client A (user X) is stored in the storage unit 1d (in FIG. 1), and the server receives from another client B (user Y) a request which is identical to the request R, the determination unit 1b determines, in step S24 in FIG. 8, that a result of processing of a request which is identical to the request from the client B is stored, and the operation goes to step S27 to acquire the stored result of the processing of the request R, and the transmission unit 1e transmits the acquired result to the client B. Since, in this case, a result of processing of the first request is stored in the server regardless of the client which has sent the request, and the stored result is used as a response to a subsequent request which is identical to the first request of which the result of processing is stored, even when the subsequent request is sent from a different client from the client which has sent the first request. Therefore, the load imposed on the server is greatly reduced.

In the case where requests contain client identification information, when a result of processing of a request R received from a client A (user X) is stored in the storage unit 1d, and the server receives from another client B (user Y) another request which is identical to the request R, the determination unit 1b determines, in step S24 in FIG. 8, that a result of processing of a request which is identical to the request from the client B is not stored for the client B, and the operation goes to step S25 to process the request R received from the client B, and the transmission unit 1e transmits the processed result to the client B. When the result of processing of the request R received from the client A (user X) is stored in the storage unit 1d, and the server receives from the same client A (user X) a request which is identical to the request R, the determination unit 1b determines, in step S24 in FIG. 8, that the result of processing of the identical request is stored for the identical client A, and the operation goes to step S27 to acquire the stored result of the processing of the request R, and the transmission unit 1e transmits the acquired result to the client A. Therefore, even in this case, it is possible to reduce a load which is imposed on the server due to repeated transmission of a request from a client. For example, even when a user transmits more than one identical request by mistake, it is possible to reduce a load which is imposed on the server due to the user's mistake.

(4) Other Matters (i) The operations and the functions of the present invention may be realized by using at least one product with the server, e.g., by installing a computer-readable medium in a computer. The product is such that when the product is used with a server (e.g., a computer), the product is able to output control information which directs the server to realize any of the functions of the present invention. The product may be a semiconductor storage device including a ROM, or a magnetic storage medium such as a floppy disc, a hard disk and an MO disk, or a CD-ROM, a CD-R, a DVD-ROM, a DVD-RAM, a DVD-R, or the like, which stores a program which realizes the above functions. Further, the above product may be a programmed hardware logic circuit such as an LSI. The above product can be put into the market. Alternatively, program data realizing the above functions may be transferred through a communication network from a storage device included in a computer system to another computer system. In order to execute the program in a processor (computer) system, for example, the program stored in a hard disk is loaded in a main memory of the processor (computer) system.

(ii) The foregoing is considered as illustrative only of the principle of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

(iii) All of the contents of the Japanese patent application, No. 2000-026019 are incorporated into this specification by reference.

What is claimed is:

1. A server, comprising:

a result storing unit which stores at least one processing result of at least one processing request;

a receiving unit which receives the at least one processing request from a client;

a request storing unit which stores the at least one processing request received from the client as a same client;

a request reading unit which reads out one of said at least one processing request as a first processing request from the same client stored in said request storing unit;

a determination unit which determines whether from the same client a subsequently received processing request which is identical to the first processing request received from the same client, has already been processed;

an execution unit which executes processing of the subsequent processing request received from the same client, and stores a result of the processing in said result storing unit when said determination unit determines that from the same client no other processing request identical to the subsequent processing request received from the same client has been processed;

a transmission unit which transmits to the same client said result of the processing executed by said execution unit when said determination unit determines that from the same client no other processing request identical to the subsequent processing request received from the same client has been processed, and transmits to the same client one of said at least one processing result corresponding to the first processing request received from the same client when said determination unit determines that from the same client the subsequent processing request identical to the first processing request received from the same client, has already been processed; and a prohibiting unit which prohibits an operation of said request reading unit after one of said at least one processing request from the same client stored in said request storing unit is read out, until a processing result corresponding to said one of said at least one processing request from the same client is transmitted to the same client.

2. A product for use with a server, said product, when used with said server, is able to output control information which directs the server to realize:

a result storing unit which stores at least one processing result of at least one processing request;

a receiving unit which receives the at least one processing request from a same client;

a request storing unit which stores the at least one processing request received from the client as a same client;

a request reading unit which reads out one of said at least one processing request as a first processing request from the same client stored in said request storing unit;

a determination unit which determines whether from the same client a subsequently received processing request which is identical to the first processing request received from the same client, has already been processed;

an execution unit which executes processing of the subsequent processing request received from the same client, and stores a result of the processing in said result storing unit when said determination unit determines that from the same client no other processing request identical to the subsequent processing request received from the same client has been processed;

a transmission unit which transmits to the same client said result of the processing executed by said execution unit when said determination unit determines that from the same client no other processing request identical to the subsequent processing request received from the same client has been processed, and transmits to the same client one of said at least one processing result corresponding to the first processing request received from the same client when said determination unit determines that from the same client the subsequent processing request identical to the first processing request received from the same client, has already been processed; and a prohibiting unit which prohibits an operation of said request reading unit after one of said at least one processing request from the same client stored in said request storing unit is read out, until a processing result corresponding to said one of said at least one processing request from the same client is transmitted to the same client.

* * * * *